United States Patent [19]

Andringa

[11] 3,740,663
[45] June 19, 1973

[54] Q-SWITCHED LASER SYSTEM
[75] Inventor: Keimpe Andringa, Sherborn, Mass.
[73] Assignee: Raytheon Company, Lexington, Mass.
[22] Filed: Dec. 21, 1970
[21] Appl. No.: 99,857

[52] U.S. Cl. .............................. 331/94.5, 350/150
[51] Int. Cl. ............................................. H01s 3/11
[58] Field of Search ..................... 331/94.5; 350/150

[56] References Cited
UNITED STATES PATENTS

| | | | |
|---|---|---|---|
| 3,329,474 | 7/1967 | Harris et al. | 350/150 |
| 3,630,595 | 12/1971 | Peek | 350/150 |
| 3,229,223 | 1/1966 | Miller | 331/94.5 |
| 3,243,724 | 3/1966 | Vuylsteke | 331/94.5 |
| 3,405,370 | 10/1968 | Kaminow | 331/94.5 |
| 3,453,559 | 7/1969 | Sharp et al. | 331/94.5 |
| 3,508,164 | 4/1970 | Uchida | 331/94.5 |
| 3,564,450 | 2/1971 | Immarco et al. | 331/94.5 |
| 3,571,744 | 3/1971 | Hook | 331/94.5 |

*Primary Examiner*—William L. Sikes
*Attorney*—Milton D. Bartlett, Joseph D. Pannone, Herbert W. Arnold and David M. Warren

[57] ABSTRACT

A Q-switched laser system wherein a simple electrooptical switching arrangement is provided, such arrangement permitting randomly polarized light radiated by a laser crystal to resonate within a resonant chamber and pass through such crystal during regenerative action. Such chamber is bounded by a pair of end reflectors and includes the laser crystal, a birefringent crystal and a Pockels cell. When the resonant chamber is in a low Q condition, during a light pumping cycle, the randomly polarized light radiated by the laser crystal is separated into an ordinary ray and an extraordinary ray by the birefringent crystal. Each such ray passes simultaneously through the Pockels cell, is each then reflected by an end reflector and repasses through the Pockels cell; however, during this low Q condition the Pockels cell is placed in a condition such that the electric field of each such ray is rotated 90° after repassage through the Pockels cell. Each ray, having had its electric field so rotated, repasses through the birefringent crystal in a direction such that neither such ray passes through the laser crystal. When the resonant chamber is a high Q condition, during the regenerative action, the Pockels cell is placed in a condition such that no rotation results to rays passing therethrough and therefore the ordinary ray and the extraordinary ray combine on repassing through the birefringent material to form randomly polarized light, such light passing through the laser crystal and thereby resonating within the resonant chamber.

7 Claims, 1 Drawing Figure

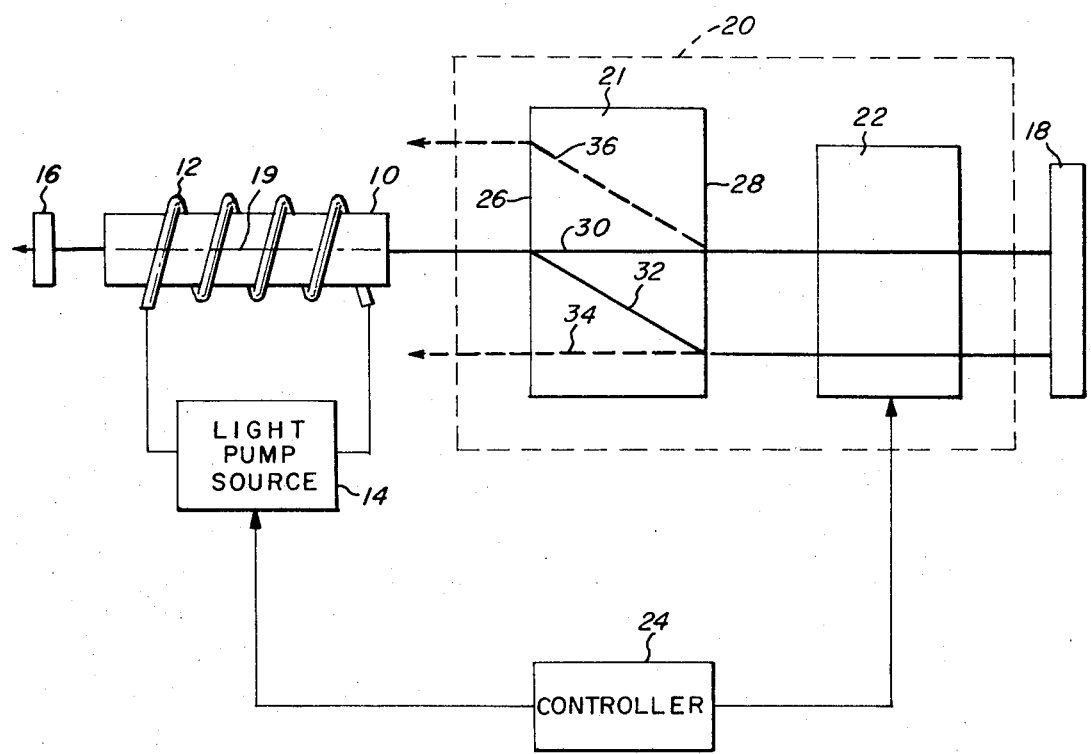

Q-SWITCHED LASER SYSTEM

BACKGROUND OF THE INVENTION

This invention relates generally to laser systems and more particularly to electrooptical Q-switching apparatus therefor.

A laser system generally includes a rod shaped ion doped laser crystal and means for pumping light energy into the laser crystal, thereby raising a portion of the ions from an original energy level to a higher energy level until an inverted population condition exists between two energy levels. Stimulated emissions of light, at a frequency corresponding to the difference between the two energy levels, is radiated from the laser crystal when the ions in the inverted populated energy level tend to return to the original energy level. The radiation is cyclically passed through the laser crystal as by placing reflectors at the ends of the laser crystal. The radiation resonates therein by being reflected back and forth between the reflectors. As the radiation so resonates through the laser crystal an increase in the number of stimulated emissions results by what is commonly called regenerative action.

A Q-switched laser system is similar to the conventional laser system described above except that the Q, or quality factor, of a resonant chamber defined by the end reflectors is changed at a predetermined time from a low Q condition to a high Q condition in the following manner: While light energy is being pumped into the laser crystal to establish an inverted population of ions between two energy levels, the Q of the resonant chamber is low, that is relatively lossy, so that the radiation emitted by the laser crystal is not reflected between the reflectors to thereby prevent stimulated emissions; after there has been a proper amount of energy pumped into the laser crystal the resonant chamber is placed in a high Q condition by allowing reflections of the radiation between the reflectors to pass through the laser crystal so that there becomes a sudden increase in the amount of stimulated emissions by regenerative action and a "giant pulse" of radiation is thereby emitted from such crystal. The "giant pulse" may be coupled out of the system by making one of the end reflectors only partially reflective or by forming a small opening within one of the end reflectors.

Techniques used to switch the Q of the resonant chamber include various electrooptical arrangements. Such arrangements commonly employ a polarization selector and polarization switch, such as a Pockels cell, in the resonant chamber so that while unpolarized light (that is, randomly polarized light) is radiated by the laser crystal only light of a first linear polarization will be resonant within the chamber and pass through the laser crystal whereas light of a second linear polarization, orthogonal to the first linear polarization, will not so resonate. In such a scheme, during the high Q condition of the chamber, light of the first linear polarization passes back and forth between the reflectors; however, as such light passes through the laser crystal the linear polarization of such light becomes distorted and having passed through the laser crystal includes components with orthogonal polarizations. Such distortions result from birefringent effects produced from temperature increases within such crystal. These orthogonal polarization components will not resonate in the chamber, however, since, as just described, the chamber allows only light of the first linear polarization to resonate therein. Consequently, the loss of such orthogonal polarization component reduces the efficiency of the resonant chamber and therefore the amplitude of the "giant pulse" is correspondingly reduced. In order to reduce such birefringent effects a cooling system has to be employed to prevent increases of temperature within the laser crystal. As is known, the magnitude of the "giant pulse" is a function, inter alia, of the crystal material; however, crystal materials which are capable of providing a relatively high pulse amplitudes generally have a relatively higher temperature increase and a correspondingly greater birefringent effect. Consequently, the design of the Q-switched laser system involves a balance between the size of the cooling system (to minimize birefringent effects within the laser material) and the size of the "giant pulse." It would therefore be desirable to employ an electrooptical shutter which allows all polarizations of light radiated by the laser crystal to resonate therein during regenerative action and thereby reduce cooling system requirements by neglecting the birefringent effects of the laser material caused by temperature increases.

SUMMARY OF THE INVENTION

It is, therefore, an object of the invention to provide an improved electrooptical Q-switched laser system.

It is also an object of the invention to provide an electro-optically Q-switched laser system wherein randomly polarized light passes through a laser crystal during regenerative action.

It is also an object of the invention to provide an electro-optically Q-switched laser system wherein randomly polarized light passes through a laser crystal during regenerative action, such system employing a simple Q-switching arrangement wherein such system operates at a high efficiency and requires a minimal capacity laser material cooling system.

These and other objects of the invention are attained generally by providing an electrooptically switched laser system wherein a resonant chamber bounded by a first and a second reflector allows randomly polarized light radiated from a laser crystal to resonate therein and pass through such crystal, an electrooptical shutter, such shutter including means for separating randomly polarized light radiated by the laser crystal into two mutually orthogonal linearly polarized rays and means for preventing at a predetermined time the randomly polarized light to so resonate.

In a preferred embodiment, during the low Q condition randomly polarized light radiated by the laser crystal is separated into an ordinary ray and an extraordinary ray by a birefringent crystal. Each such ray then passes through a polarization switch and after being reflected by the first reflector repasses through such switch whereby the electric field of each one of such rays is rotated 90° by the polarization switch. The rays processed by the polarization switch repass through the birefringent material in two separate rays, neither one of such rays reentering the laser crystal. During the high Q condition the ordinary light radiated by the laser crystal is separated into an ordinary ray and an extraordinary ray; however, the electric fields of each one of such rays is not rotated by the polarization switch and each such ray recombines to form randomly polarized light within the birefringent crystal on repassage therethrough and thereby resonate through the laser crystal.

BRIEF DESCRIPTION OF THE DRAWINGS

Other objects and many of the attendant advantages of the invention will be readily appreciated as the same becomes better understood by reference to the following detailed description when considered in connection with the accompanying drawing wherein the FIGURE shows a Q-switched laser system somewhat simplified and employing the principles of the invention.

DESCRIPTION OF THE PREFERRED EMBODIMENT

Referring now to the FIGURE, it should first be noted that, for convenience, a solid neodymium-doped yttrium aluminum garnet crystal has been selected to illustrate how this invention may be applied. Thus the system includes a laser crystal 10, here in the form of a cylindrical rod, and means, including a spiral flash lamp 12 surrounding laser crystal 10 and connected to a light pump source 14 suitable for pumping light into crystal 10 to thereby establish an inverted population state of ions between two energy levels within the laser crystal 10. A resonant chamber for providing regenerative action is bounded by end reflectors 16 and 18. Reflectors 16 and 18 have their reflective surfaces orthogonal to axis 19, such axis also being the longitudinal axis of the laser crystal 10. Reflector 16 is partially reflected, here about 65 percent reflective, to couple light out of the resonant chamber. Disposed within the resonant chamber, in addition to the laser crystal 10, is an electrooptical shutter system 20, including a high birefringent crystal 21, here a calcite crystal, and a polarization switch, here a Pockels cell 22. It is here noted that such polarization switch may be a Kerr cell or a Faraday rotator. The Pockels cell 22 is arranged such that when an electrical signal is supplied to the Pockels cell from controller 24 the electric field of light repassing through such Pockels cell after being reflected by reflector 18 is rotated substantially 90°, whereas in the absence of such an electrical signal the electric field of light passing through such Pockels cell is not rotated to any significant degree. Birefringent crystal 21 has two essentially parallel flat faces, 26 and 28, such faces being orthogonal to axis 19.

The relative position and size of laser crystal 10, birefringent crystal 21, Pockels cell 22 and reflectors 16 and 18 can best be defined by describing the optical path of light leaving the right side end of laser crystal 10. In the absence of an electrical signal from controller 24 to Pockels cell 22 randomly polarized light radiated by laser crystal 10 follows a path substantially coaxial with the axis 19 as shown by the solid line. Such randomly polarized light enters birefringent crystal 21 where it is separated into an ordinary ray 30 and a spatially displaced extraordinary ray 32, each such ray being essentially parallel to axis 19 and to the other upon leaving such birefringent crystal. As is well known, the electric field of one such ray is of mutually orthogonal linear polarization relative to the other. The ordinary ray and extraordinary ray simultaneously pass through Pockels cell 22. The ordinary ray and the extraordinary ray, after being reflected by reflector 18, repass through the birefringent crystal 21 and combine in a well known manner to form randomly polarized light. Such randomly polarized light follows the same path, but in opposite direction, from that path followed by the light radiated by laser crystal 10, that is, coaxial with axis 19. When an electrical signal is supplied to Pockels cell 22, randomly polarized light radiated by laser crystal 10 enters birefringent crystal 21 where it is separated into an ordinary ray 30 and a spatially disposed linearly orthogonal polarized extraordinary ray 32, each such ray being essentially parallel to axis 19 and to the other upon leaving such birefringent crystal, as previously described. The ordinary ray and the extraordinary ray, however, have their electric fields altered by the electrically actuated Pockels cell on passing through such Pockels cell from the right and after each such ray is reflected by reflector 18 are altered a second amount by the Pockels cell on repassage therethrough from the left. As discussed, each ray repassing through the Pockels cell 22 and entering side 28 of birefringent crystal 21 have had their electric fields rotated 90° relative to the orientation of their respective electric fields upon entering side 26 of such birefringent crystal. Therefore, each ray now entering side 28 of birefringent crystal 21 follows a path coaxial with the dotted lines, as shown. In particular, the extraordinary ray (having had its electric field rotated 90°) passes directly through birefringent crystal 21 along path 34 and the ordinary ray (having had its electric field rotated 90°) passes along path 36. Each such ray leaves such birefringent crystal specially displaced from the other, parallel to axis 19, and each with mutually orthogonal linear polarization. The fabrication of the birefringent crystal 21 is such that the ordinary ray and the extraordinary ray repassing through such birefringent crystal will not pass through laser crystal 10, as shown.

From the discussion above the operation of the Q switched laser system can now be readily understood. In particular, a signal from controller 24 is supplied to light pump source 14 whereby light energy is supplied to laser crystal 10 by the light pump source and the flash tube 12 in a conventional manner. During this light pumping cycle an electrical signal is also supplied to the Pockels cell 22 by controller 24 and an inverted population of ions within laser crystal 10 takes place between a first and second energy level therein. It is here noted that the laser system resonant chamber is in a low Q condition during this light pumping cycle since, as described above, light radiated by laser crystal 10 does not reflect back and forth through such crystal.

When the desired inverted population level is attained the electrical signal supplied by controller 24 to Pockels cell 22 is removed, thereby allowing randomly polarized light radiated by the laser crystal to pass back and forth through laser crystal 10 in the manner described above. A "giant pulse" produced by this switching is coupled from the resonant chamber by means of the partial reflectivity of reflector 16.

As is obvious to one of ordinary skill in the art, the Q-switching arrangement described herein could be used to modulate the amplitude of a continuous laser system by varying the magnitude of the signal applied to Pockels cell 22. It is also obvious that the laser crystal 10 would be of either the gas or semiconductor type instead of the solid type crystal herein described.

It is felt, therefore, that this invention should not be restricted to the proposed embodiment but rather should be limited only by the spirit and scope of the following claims.

What is claimed is:

1. In combination:
   a. a laser medium;

b. means coupled to such laser medium for producing an inverted population state of laser ions between at least two energy levels;

c. a resonant chamber for directing light radiated by the laser medium to pass through such medium;

d. means for preventing regenerative action until a predetermined inverted population state is generated and for allowing regenerative action by enabling the light radiated by the laser medium to pass through such laser medium, such preventing means including: means for separating the light into two components, each having different polarization states; and means for simultaneously rotating the electric fields of both such components.

2. The combination recited in claim 1 wherein the directing means is a resonant chamber including a pair of reflective elements for reflecting the light back and forth between such reflective elements.

3. The combination recited in claim 1 wherein the separating means is a birefringent medium for separating the light into two parallel spatially displaced components having mutually orthogonal linear polarizations.

4. The combination recited in claim 3 wherein the rotating means comprises a polarization switch disposed such that the two components pass therethrough.

5. In combination:

a. a lasing element for producing a flow of randomly polarized electromagnetic energy in a desired direction;

b. means for separating the randomly polarized electromagnetic energy produced by the lasing element and flowing in the desired direction into an ordinary ray and an extraordinary ray and for directing the ordinary ray and the extraordinary ray, after having the direction of flow thereof reversed from the desired direction, along a first or a second path in accordance with the orientation of the electric field of each such reversed ray, only the first path passing through the lasing element; and, c. a polarization switch disposed in the path of the ordinary ray and the extraordinary ray for switching the orientation of the electric field of each such ray at a desired time.

6. A laser system comprising:

a. a resonant chamber including a pair of reflective elements; and b. means, disposed in such chamber, for preventing randomly polarized electromagnetic energy produced by a lasing element from resonating in such resonant chamber before a desired time and for enabling such randomly polarized electromagnetic energy to resonate in such resonant chamber between the pair of reflective elements and pass through the lasing element after such desired time, such means comprising:

i. means disposed in the resonant chamber, for separating the randomly polarized electromagnetic energy produced by the lasing element into an ordinary ray and an extraordinary ray and for directing the ordinary ray and extraordinary ray, after having the direction of flow thereof reversed, along a first or a second path in accordance with the orientation of the electric field of each such reversed ray, only such first path passing through the lasing element; and ii. a polarization switch, disposed in the path of the ordinary ray and the extraordinary ray, for switching the orientation of the electric field of each such ray at the desired time.

7. The laser system recited in claim 6 wherein the path of the ordinary ray and the extraordinary ray are spatially displaced and mutually parallel as both such rays pass through the polarization switch.

* * * * *